United States Patent [19]

Murty

[11] 4,032,476
[45] June 28, 1977

[54] GRANULAR ACTIVATED CARBON MANUFACTURE FROM SUB-BITUMINOUS COAL MIXED WITH CONCENTRATED INORGANIC ACID WITHOUT PITCH

[75] Inventor: Hari N. Murty, Grand Island, N.Y.

[73] Assignee: The Carborundum Company, Niagara Falls, N.Y.

[22] Filed: June 11, 1975

[21] Appl. No.: 585,931

[52] U.S. Cl. .............................. 252/444; 252/422; 252/423; 252/445; 423/449; 264/29.1
[51] Int. Cl.$^2$ .................. B01J 21/18; C01B 31/08; C01B 31/10; C01B 31/14
[58] Field of Search .......... 252/423, 422, 421, 445, 252/444; 423/449; 264/29

[56] References Cited

UNITED STATES PATENTS

| | | | |
|---|---|---|---|
| 1,525,770 | 2/1925 | Ernst et al. | 252/423 |
| 1,641,281 | 9/1927 | Lueg et al. | 252/422 |
| 3,483,134 | 12/1969 | Olson | 252/423 |
| 3,630,959 | 12/1971 | Kiikka | 252/422 |
| 3,864,277 | 2/1975 | Kovach | 252/422 |
| 3,876,505 | 4/1975 | Stoneburner | 252/445 |

Primary Examiner—Winston A. Douglas
Assistant Examiner—P. E. Konopka
Attorney, Agent, or Firm—David E. Dougherty; Robert C. Weber

[57] ABSTRACT

Granular activated carbon is manufactured from sub-bituminous coal by crushing and screening the as received coal containing 17% moisture by weight to produce 8/30 mesh granules which are treated by mixing with about 5% by weight of concentrated inorganic acid ($H_2SO_4$, $H_3PO_4$ or HCl), without the addition of a carbonaceous binder. The so treated granules are ground to more than 65% by weight −325 mesh powder, preferably 75 to 85% by weight −325 mesh, which powder has a moisture (including acid) content of about 21% by weight, as a temporary binder, and which powder is compressed into pellets of 0.5 inch diameter and 0.5 inch long under a pressure of 40,000 to 80,000 psi, and then granulated to obtain 6/20 mesh granules. These granules are devolatilized by heating to 450° C at 300° C/hour in an atmosphere of $N_2$ and the volatiles and by maintaining the temperature for 1 hour, and then activated by heating to 800° to 900° C in an atmosphere of $N_2$ and steam and by maintaining the temperature for 4 to 5 hours. The overall yield of granular activated carbon is 25 to 35% by weight of the dry coal, and the activated granules have a surface area of 900 to 1050 m$^2$/gram, an iodine number of 900 to 1100, an ash content of 10 to 12%, an abrasion number of 80, and an apparent density of 0.48 to 0.50 gram/cc, which properties make them suitable for use in waste water treatment and other applications.

23 Claims, 1 Drawing Figure

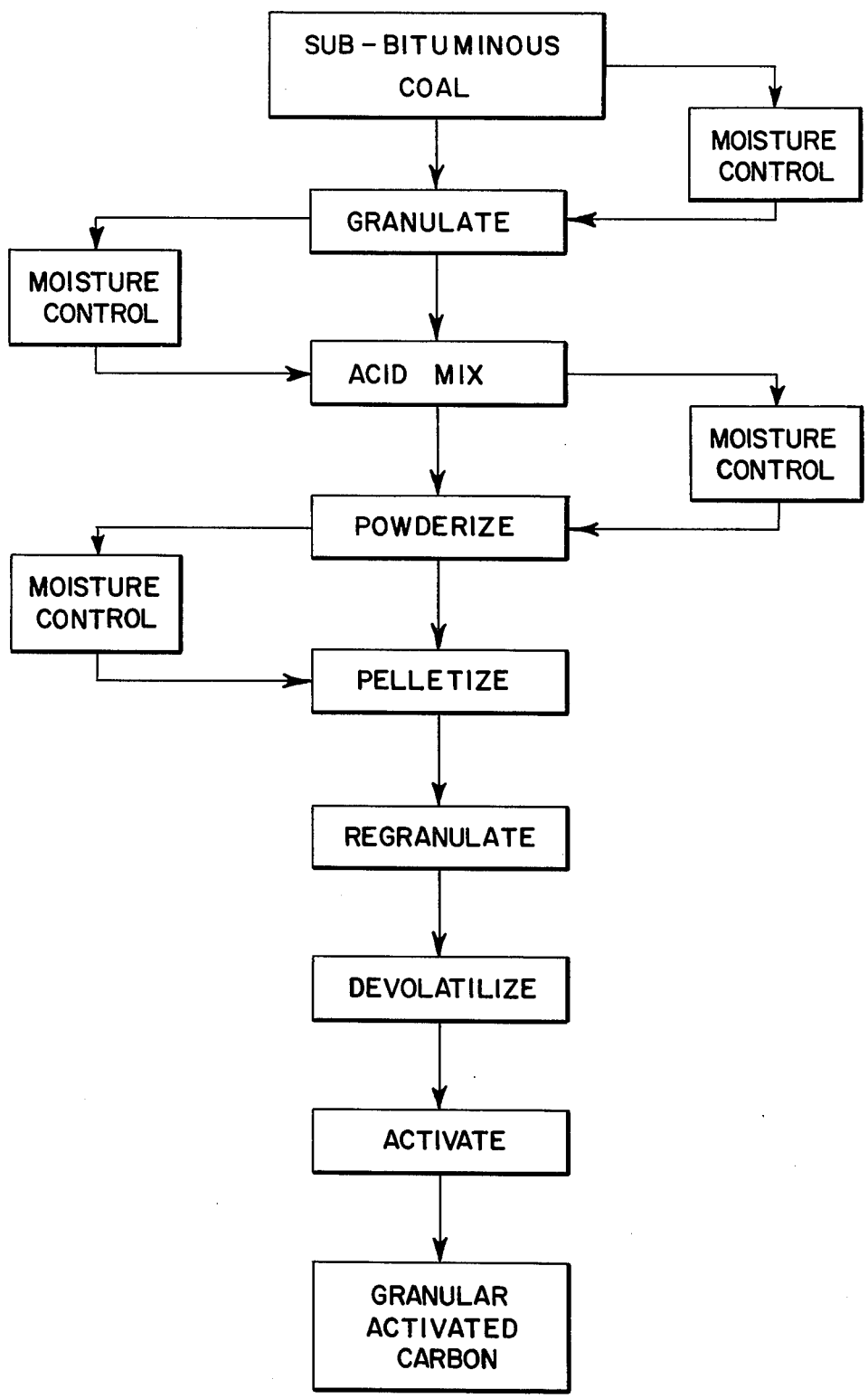

GRANULAR ACTIVATED CARBON MANUFACTURE FROM SUB-BITUMINOUS COAL MIXED WITH CONCENTRATED INORGANIC ACID WITHOUT PITCH

CROSS REFERENCE

This application is related to my copending application Ser. No. 578,061, filed May 16, 1975.

BACKGROUND OF THE INVENTION

Field of the Invention

This invention relates to granular activated carbon manufacture, and more particularly to a new and improved process for making granular activated carbon from sub-bituminous coal mixed with concentrated inorganic acid, without the addition of a carbonaceous binder, and to a new and improved granular activated carbon made by such process and having properties which make it suitable for use in waste water treatment and other applications.

GLOSSARY OF TERMS

In order to facilitate a clear understanding of this invention, various terms of art employed herein are defined as follows.

Abrasion number — is a measure of the resistance of the activated carbon granules to degrading on being mechanically abraded. It is measured by contacting a sample with steel balls in a pan on a machine and shaking the contents for a given time and determining the resultant particle size distribution and hence the mean particle diameter. The abrasion number is the ratio of the final average (mean) particle diameter to the original average (mean) particle diameter (determined by screen analysis) times 100.

Activated carbon — is carbon which is "activated" by heating to high temperature preferably with steam or carbon dioxide as the gaseous activating agent in producing an internal porous particle structure.

Adsorption isotherm — is a measurement of the adsorptive capacity of an adsorbent (viz. granular activated carbon) as a function of the concentration, or pressure, of the adsorbate (viz. $N_2$) at a given temperature. It is defined as the constant temperature relationship between the amount adsorbed per unit weight of adsorbent and the equilibrium concentration, or partial pressure.

Apparent density — is the weight per unit volume of homogeneous granular activated carbon. To assure uniform packing of the granules during measurement, a vibrating trough is used to fill the measuring device.

Ash — is a principal mineral constituent of coal, carbon and pitch. It is normally defined as a weight percent basis after a given amount of sample is reduced to ash.

Average (mean) particle diameter — is a weighted average diameter of granular activated carbon sample. A screen analysis is run and the average particle diameter is calculated by multiplying the weight of each fraction by its average diameter, adding the products, and dividing by the total weight of the sample. The average diameter of each fraction is taken as the size midway between the sieve opening through which the fraction has passed and the sieve opening on which the fraction was retained.

Coking value — is usually expressed as percent residual carbon obtained when a dry sample of coal, tar or pitch is vaporized or pyrolized for a specific time at a specific temperature that limits the available oxygen supply (ASTM Method D-2416). The coking value, expressed as percent residual carbon, indicates the coke forming properties of the material.

Granular activated carbon — is "activated carbon" which has a particle size, i.e., "mesh", which is not less than about 40.

Iodine number — is the milligrams of iodine adsorbed by 1 gram of granular activated carbon at a equilibrium filtrate concentration of 0.02 N iodine. It is measured by contacting a single sample of carbon with an iodine solution and extrapolating to 0.02 N by an assumed isotherm slope. This number can be correlated wth the ability of granular activated carbon to adsorb low molecular weight substances.

Mesh — (or mesh size) is the particle size of granules as determined by the U.S. Sieve Series or the Tyler Series. Usually, this term refers to the sizes of the two screens, in either of the above series, between which the bulk of a sample falls. For example, "8/30 mesh" (or "8 by 30 mesh" or "8 × 30 mesh") means that 90% by weight of the sample will pass through a No. 8 screen but will be retained on a No. 30 screen. Alternatively, this term refers to a maximum particle size, such as in defining the fineness of powder material. For example, "65% by weight −325 mesh powder" means that 65% by weight of a given sample passes through a No. 325 mesh screen.

Pitch — is a black or dark viscous substance obtained as a residue in the distillation or organic materials and especially tars.

Powder — means a particle size, i.e., "mesh", which is smaller than about 40. The larger the mesh number, the smaller the size.

Sub-bituminous coal — is an intermediate stage coal which ranks above lignite and brown coals, but below bituminous coal. In the as received condition it has, by weight, (1) a proximate analysis of: from about 15% to about 25% moisture, from about 35% to about 45% volatile material, from about 2% to about 5% ash, and from about 25% to about 45% fixed carbon, and (2) an ultimate analysis of: from about 65% to about 75% carbon, from about 4% to about 8% hydrogen, from about 0.5% to about 2.0% nitrogen, and from about 0.5% to about 1.0% sulfur.

Surface area — is the amount of surface area per unit weight of granular activated carbon; it is determined from the nitrogen adsorption isotherm by the Brunauer, Emmett and Teller (BET) method, and it is expressed in $m^2$/gram.

PRIOR ART

Granular activated carbon is particularly useful in waste water treatment not only because it is highly effective in purifying the effluent from municipal and industrial sewage but also because it can be regenerated for repeated use. However, in order to accomplish these objectives it must possess certain properties, namely, a minimum surface area of about 900 $m^2$/gram for adequate adsorption capacity, a minimum iodine number of about 900 for adequate adsorption of low molecular weight substances, a maximum ash content (by weight) of not more than about 12%, and preferably not more than about 8%, for purity, a minimum abrasion number of about 70 and preferably not less than about 80, for adequate hardness in maintaining granular integrity in use and in regeneration, and a minimum apparent density of not less than about 0.46 gram/cc, preferably about 0.48 gram/cc, for obtaining the dense closely packed beds and columns needed in waste water treatment.

These properties can be obtained by making granular activated carbon from bituminous coal, but until the present invention it is not known that anyone else has accomplished this from sub-bituminous coal, which is considerably cheaper, as the starting material, by mixing with concentrated inorganic acid, without the addition of a carbonaceous binder.

In the aforesaid copending application, it was found that this objective could be accomplished by dilute inorganic acid leaching of sub-bituminous coal. However, this involved treating the coal granules by leaching, by washing off the acid and by drying. In one case, the granules were dried partially to a moisture content of about 15% by weight without the addition of a carbonaceous binder. In the other case, the granules were dried thoroughly and mixed with about 10% by weight of coal tar pitch, the thorough drying being necessary so that there would not be sufficient moisture remaining as a barrier to obtaining a coherent bond between the granules and the pitch binder. In the present invention, the treatment is simplified by mixing the coal granules with a small amount of concentrated inorganic acid, without the addition of a carbonaceous binder, while controlling the moisture (including acid) content of the powder formed from the treated granules in order to permit proper pelletizing and further processing to produce granular activated carbon, wherein the moisture (including acid) content of the powder is used as a temporary binder, all as described in detail below.

Moreover, when so using bituminous coal, it has been found necessary herein not only to mix in pitch but also to char the granulated mixture prior to the devolatilizing and activating steps. Otherwise, because of the high coking tendency of the preferred bituminous coals, the granules fuse together during devolatilization and are thereby rendered unsuitable both for proper activation and for obtaining the aforesaid desired properties. Likewise, in the present work herein, it has been found that for bituminous coals this charring step is necessary, whether or not the granules have been mixed with a concentrated inorganic acid prior to charring, and that such acid mixing has little, if any, beneficial effect upon either the overall yield of the resulting granular activated carbon or the aforesaid properties desired.

In the prior art, there have been some efforts, as exemplified by U.S. Pat. No. 3,630,959 to deal with the problem of fusion of bituminous coal granules by the addition of 40 to 50% by weight of concentrated acid, where presumably the acid, during heating up to devolatilization temperature, reacted with the coal to eliminate the tendency for fusion. However, the large amounts of acid employed, and the fact that it was given off during deacidification (charring and devolatilizing) within the furnace had many undesirable effects, such as corrosion of the equipment, and loss or expensive recovery of the vapors. Thus, this patent does not represent a successful method of handling or treating the highly coking bituminous coals without the charring step, and in any event, the patented process per se, does not produce granular, but only powdered activated carbon.

Furthermore, it has been found herein that granular activated carbon of the aforementioned properties can not be produced from sub-bituminous coal when such coal is not subjected to such acid mixing or charring, despite the fact that such coal usually is not well coking. Although it has been found herein that sub-bituminous coal can be charred, without acid mixing, to produce granular activated carbon, the yield is very low and the properties, at best are borderline or below the minimum acceptable for granular activated carbon suitable for use in waste water treatment and other applications. As a matter of fact, it has been found herein that the charring step, originally thought necessary for so processing sub-bituminous coal, can be eliminated, and that if appropriate concentrated inorganic acid mixing treatment is employed, this results in significant increases not only in yield, but also in the desired properties, without the need for a carbonaceous binder.

SUMMARY OF THE INVENTION

Accordingly, a general primary objective of the present invention is (1) to provide a new and improved process for making granular activated carbon from lower cost sub-bituminous coal instead of higher cost bituminous coal, and wherein there is eliminated not only the charring step necessary for processing bituminous coal, but also the problems created by using large amounts of acid in such bituminous coal processing, while the overall yield of granular activated carbon is incresed significantly by appropriate treatment of sub-bituminous coal by mixing with a small amount of concentrated inorganic acid, without the addition of a carbonaceous binder; (2) as well as to provide a new and improved granular activated carbon made by such process and having the aforementioned described properties of adsorption (as measured by surface area and iodine number) purity (as measured by ash content), hardness (as measured by abrasion number) and density (as measured by apparent density), which make it suitable for use in waste water treatment and other applications. To this end, the invention includes (1) a process for making granular activated carbon comprising: forming granules from sub-bituminous coal; treating the granules by mixing with not less than about 1 and not more than about 10% by weight of concentrated inorganic acid without the addition of a carbonaceous binder; reducing the treated granules to form powder having a moisture (including acid) content of not less than about 10 and not more than about 30% by weight; [or as alternately expressed: treating the granules by mixing with not less than about 1 and not more than about 10% by weight of concentrated inorganic acid; reducing the treated granules to powder having not less than about 10 and not more than about 30% by weight of temporary binder consisting essentially of water and such acid;] compressing the powder to form pellets; reducing the pellets to reform granules; devolatilizing the reformed granules; and activating the devolatilized granules; and (2) granular activated carbon made by such process.

A specific primary objective is to provide (1) such process wherein the acid is selected from the group consisting of $H_2SO_4$, $H_3PO_4$, HCl 1and mixtures thereof, at a concentration of at least about 50% by weight; the powder is more than about 65% by weight −325 mesh; the reformed granules are devolatilized without charring by heating directly to and at temperature higher than the charring temperature in an oxygen-free atmosphere; and the devolatilized granules are activated by heating to and at a temperature higher than the devolatilizing temperature in an atmosphere containing a gaseous activating agent; and (2) granular activated carbon made by such process.

A more specific primary objective is to provide (1) such process wherein the granules are mixed with about 5% by weight of such acid, at a concentration of at least about 75% by weight; the powder has a moisture content, including acid of about 15 to about 25% by weight; the reformed granules are devolatilized by heating to a temperature of about 450° C at a rate of about 300° C/hour in an atmosphere of $N_2$ and the volatiles and by maintaining the devolatilizing temperature for a time of about 1 hour; and the devolatilized granules are activated by heating to a temperature of about 800° to about 900° C in an atmosphere of $N_2$ and steam and by maintaining the activating temperature for a time of about 4 to about 5 hours; in order to produce an overall yield of granular activated carbon of about 25 to about 35% by weight, dry basis; and (2) granular activated carbon made by such process and having a surface area of about 900 to about 1050 $m^2$/gram, an iodine number of about 900 to about 1100, and ash content of about 9 to about 12% by weight, an abrasion number of about 80, and an apparent density of about 0.48 to about 0.50 gram cc.

An even more specific primary objective is to provide (1) such process wherein the acid is $H_3PO_4$, and the overall yield is about 30 to about 35% by weight, dry basis; and (2) granular activated carbon made by such process and having a surface area of about 900 to about 1050 $m^2$/gram, and iodine number of about 900 to about 1100, an ash content of about 10 to about 12% by weight, an abrasion number of about 80, and an apparent density of about 0.48 to about 0.50 gram/cc.

Additional objectives and advantages of the invention will become apparent upon consideration of the following detailed description and accompanying drawing wherein:

BRIEF DESCRIPTION OF THE DRAWING

The single figure is a block diagram or flow sheet illustrating schematically the various steps of the process, as well as the resulting product, both embodying the invention.

DESCRIPTION OF THE PREFERRED EMBODIMENTS

In this detailed description, reference will be made to 9 Examples, of which Examples 1 and 5-7 relate to and provide background for the present invention, while Examples 2-4, 8 and 9 are illustrative of the invention per se. Moreover, the order or sequence of the Examples has been selected in order to show a progression in experimentation from Example 1, which represents an attempt to apply a known charring technique for making granular activated carbon from bituminous coal to sub-bituminous coal; through the inventive acid mixing techniques of Examples 2-4; to Examples 5 and 6 which compare the results obtained by attempting to superimpose an inventive acid mixing technique (Example 6) on a known charring technique (Example 5) for making granular activated carbon from bituminous coal; to Example 7, which shows that an inventive acid mixing technique does not work as well for lignite, and finally to inventive Examples 8 and 9 which show the importance of moisture control (Example 8) and fineness of grinding in powderizing (Example 9).

EXAMPLE 1

CHARRING OF SUH-BITUMINOUS COAL IN MAKING GRANULAR ACTIVATED CARBON

In making granular activated carbon from bituminous coal it has been found necessary to char the coal granules prior to activation, as will be seen below in Examples 5 and 6. Thus, this technique was adopted in order to see what sort of product could be so obtained from sub-bituminous coal. The starting material for these and each of the ensuing Examples 2-4, 8 and 9 was a batch of Wyoming sub-bituminous coal having the following analyses, by weight, in the as received condition:

| Proximate Analysis | | Ultimate Analysis | |
| --- | --- | --- | --- |
| Moisture | 17% | Carbon | 69.8% |
| Volatile Material | 44% | Hydrogen | 5.4% |
| Ash | 2.05% | Nitrogen | 0.9% |
| Fixed Carbon | 35% | Sulfur | 0.55% |

These analyses are, in general, typical of a subbituminous coal. The as received coal was crushed to a very fine size such that more than 65% by weight of the material passed through 325 mesh screen, preferably 75 to 85% −325 mesh. The powder was pressed at 40,000 to 80,000 psi pressure into cylindrical pellets approximately ½ inch high and ½ inch diameter. The apparent density of these pellets was in the rante of 1.1 to 1.2 grams/cc. The pellets then were granulated to obtain granules of 6 by 20 mesh with an apparent density in the range of 0.64 to 0.68 gram/cc. In the course of experimentation, as will be seen from Examples 2-4 and particularly 8, it was found herein that to obtain from the pellets compact granules (suitable for obtaining hard granular activated carbon) without the use of a carbonaceous binder such as coal tar pitch, the moisture content of the subbituminous coal and of the treated granules and powder (including acid) is important. Too low a mositure content, by weight, i.e., below about 5% for the coal or 10% for the treated granules and powder, or too high a moisture content, by weight, i.e., above about 30% for the coal, treated granules and powder, led to poor compaction of the pellets, and hence few granules having little cohesion. Likewise, if the moisture content of the coal is too great, in the as received condition, for example as the result of a rainstorm, it should be dried, before granulating, to the desired moisture content range. Otherwise, crushing and screening are unduly difficult. In this Example, the 17% by weight content of the coal was well within the prescribed limits, and hence no drying was necessary, in the first instance.

600 grams of the reformed granules obtained according to the procedure described above were loaded into a cylindrical container prepared from 5 mesh screen. The container was mounted onto a cylindrical shaft and the assembly was loaded into a cylindrical furnace so that the container and the granules therein were rotated slowly and uniformly inside the furnace.

The granules then were subjected to a charring treatment wherein the granules were heated in an atmosphere of air and nitrogen (deficient oxygen) to 200° C at the rate of 100° C/hour, and maintained at this temperature for 1 hour. During the process, the granules were slowly and uniformly rotated (1 to 8 rpm) so that they were exposed to the oxidizing action of $O_2$ percent. During the course of experimentation, it was found that higher temperatures and/or higher oxygen content in the atmosphere led to poor process control and eventually a poor product. The loss of weight in the charring step was in the range of 5 to 10% by weight based on the dry coal. The granular material then was subjected to a devolatilization process. The granules were loaded into the furnace described above and heated to 450° C at the rate of 300° C/hour in an atmosphere free from oxygen (in the present case an atmosphere composed of $N_2$ and the volatiles given off by the granules), and maintained at the devolatilizing temperature for 1 hour and then cooled. During the course of experimentation it was learned that the charring and devolatilization steps could be carried out sequentially without cooling down, provided the atmosphere was altered such that it was nearly free of oxygen during heat up beyond 200° C. It also was learned that presence of oxygen at these higher temperatures led to higher losses, poorer yield of product and inferior granular product.

The yield of granules after devolatilization was about 60% by weight based on charred granules, and their apparent density was about 0.6gram/cc.

Next, the devolatilized granules were loaded into a cylindrical furnace and were subjected to activation by heating the granules to 800° to 900° C in an atmosphere composed of a carrier gas of $N_2$ and steam and by maintaining the granules at the activating temperature for 4 to 5 hours. The amount of steam fed in was pre-determined such that it amounted to 1 to 3 grams of steam/gram of charge/hour.

The yield of granular activated carbon from this step was in the range of 30 to 40% by weight based on devolatilized material. The granular product has a surface area of 900 to 1000 m²/gram, an ash content in the range of 7 to 10% by weight, an abrasion number of 60 to 70 and an apparent density in the range of 0.45 to 0.48 gram/cc.

The overall yield based on dry coal was 20 to 22% by weight and the granules had adsorption properties, ash, density and hardness which were below or on the borderline in being acceptable as a granular activated carbon for use in waste water treatment and other applications. During the course of experimentation, it was learned that if the sub-bituminous coal was processed as above, but without the charring step, the resultant product was soft and had little activity, thus indicating the importance of charring the sub-bituminous coal (when processed by itself), even though such a coal is not very highly coking.

The following Examples 2–4 represent preferred embodiments of the present invention, which is represented schematically in the drawing. Thus, from a method standpoint, the inventive process generally includes the steps of granulating the sub-bituminous coal, which either has, in the as received condition, the proper moisture content range of about 5 to about 30% by weight, preferably about 10 to about 25% by weight, or is dried, as shown at the upper right of the drawing, to so control such moisture content prior to granulating; followed by the steps of treating the granules by mixing with a small amount of concentrated inorganic acid, while maintaining their moisture content at an amount of not less then and preferably more than about 10 but not more than about 30% by weight, without the addition of a carbonaceous binder; powderizing; pelletizing; regranulating; devolatilizing; and activating; all in order to produce the desired inventive product of granular activated carbon which is acceptable for use in waste water treatment and other applications. Examples 2 and 4 represent two preferred embodiments of such treatment wherein the granules are mixed with concentrated $H_2SO_4$ and HCl respectively, while Example 3 represents a most preferred embodiment of such treatment wherein the granules are mixed with concentrated $H_3PO_4$.

EXAMPLE 2

MIXING OF $H_2SO_4$ AND SUB-BITUMINOUS COAL GRANULES WITHOUT PITCH IN MAKING GRANULAR ACTIVATED CARBON

A batch of Wyoming sub-bituminous coal having the analyses described in Example 1 was crushed and screened to obtain 8 × 30 mesh granules. 900 grams of the granules were mixed with about 5% by weight of concentrated $H_2SO_4$ in the ratio of 95 grams of coal and 5 grams of acid of 95% concentration by weight.

During the course of experimentation, it was learned that size of granules, thoroughness of mixing, concentration of acid, and the ratio of acid to coal all have important effects on further processibility of the coal to form suitable granular activated carbon. Therefore, the specific numbers cited in this and the ensuing inventive Examples are merely illustrative and not restrictive. For example, both coarser and finer granules can be employed during mixing with corresponding results, the amount of acid added to coal should be not less than about 1% and not more than about 10%, preferably about 5% (i.e., percent of acid used, by weight).

The treated granules containing about 21% (actually 21.15%) by weight of moisture (including acid) were milled into a very fine powder such that more than 65% by weight of the material passed through 325 mesh screen, preferably 75 to 85% -325 mesh, as explained in Example 8 below. In view of the fact tht the moisture content of the coal, as received (about 17% by weight) and of the treated granules (about 21%, including acid) was well within the prescribed limits, no drying of the coal or of the treated granules was required.

The powder was pressed into cylindrical pellets of ½inch diameter and ½inch high using a pressure of 40,000 to 80,000 psi, the apparent density of the pellets being in the range 1.1 to 1.2 gram/cc, and these pellets were regranulated to obtain 6 × 20 mesh granules having an apparent density of 0.65 to 0.68 gram/cc. 600 grams of the reformed granules were loaded into a cylindrical furnace and devolatilized as described in Example 1, which consisted of heating the granules to 450° C at 350° C/hour in an atomosphere free of oxygen and holding at temperature for 1 hour. During the course of experimentation it was learned tht the granules need not be subjected to the charring step described in Example 1 to make hard and highly adsorptive granular activated carbon. Two batches of identical material, treated by mixing with acid as described above, were processed, one with a charring step and the other wihout. While the yields in specific process steps varied, the overall yield and activity of the granular activated carbon product were the same, indicating that the charring step can be eliminated for this material. This presumably was a result of the coal being subjected to the action of the acid before and during devolatilization.

The devolatilized granules, which had an apparent density of 0.62 to 0.64 gram/cc and a yield of 50% by weight based on the dry coal, were loaded into a cylindrical furnace and subjected to activation by heating the granules to 800° to 900° C in an atmosphere composed of $N_2$ and steam, and by maintaining the granules at this temperature for 4 to 5 hours. The amount of steam fed into the funace was precalibrated such that it amounted to 1 to 3 grams of steam/gram of charge/hour.

The resulting overall yield of granular activated carbon, based on the dry coal, was in the range of 25 to 30% by weight versus 20 to 22% for Example 1. The granules had a surface area of 900 to 1050 m²/gram, as compared to 900 to 1000 for Example 1, an iodine number of 900 to 1100, an ash content of 10 to 12% by weight, as compared to 7 to 10% for Example 1, an abrasion number of 80 as compared to 60 to 70 for Example 1, and an apparent density of 0.48 to 0.50 gram/cc, as compared to 0.45 to 0.48 for Example 1.

Thus, these granules were hard, very adsorptive, and except for ash content, were comparable to other grades of carbon preferred for use in waste water treatment and other applications, particularly in view of the increase in yield, hardness and density which are attributed to the treatment with acid in lieu of the charring step. Further, it is to be noted that not only can an acceptable granular activated carbon product be made from sub-bituminous coal without the use of any carbonaceous binder such as coal tar pitch, and without charring, but also that treatment by mixing with a small amount of concentrated acid significantly increases yield and adsorption, all as compared to Example 1. It also is noteworthy that a hard granular activated carbon was pepared from sub-bituminous coal (with abrasion number of 80) for the first time without the use of a carbonaceous binder.

EXAMPLE 3

MIXING OF $H_3PO_4$ AND SUB-BITUMINOUS COAL GRANULES WITHOUT PITCH IN MAKING GRANULAR ACTIVATED CARBON

A batch of Wyoming sub-bituminous coal having the analyses described in Example 1 was crushed and screened to obtain 8 × 30 mesh granules, 900 grams of which were mixed with about 5% by weight of concentrated $H_3PO_4$ in the ratio of 95 grams of coal and 5 grams of commercially available acid of 75% by weight concentration. The treated granules containing about 21% by weight of moisture (including acid), which was well within the above limits, were milled into a very fine powder such that more than 65% by weight of the material passed thrugh 325 mesh screen (65% by weight −325 mesh), preferably 75 to 85% −325 mesh.

The powder was pressed into cylindrical pellets of ½inch diameter and ½inch long using a pressure of 40,000 to 80,000 psi, and the apparent density of the pellets was in the range 1.1 to 1.2 grams/cc.

The reformed granules were loaded into a cylindrical furnace and devolatilized as described in Example 1, but with no charring being necessary prior to such devolatilization. The devolatilized granules, which had an apparent density of 0.58 to 0.60 gram/cc, and a yield of 55% to 65% by weight, based on the dry coal, were activated in the manner also set forth in Example 1.

The overall yield of granular activated carbon, based on the dry coal, was in the range of 30 to 35% by weight, versus 20 to 22% for Example 1 and 25 to 30% for Example 2. The granules had a surface area of 900 to 1050 m²/gram, versus 900 to 1000 for Example 1, an iodine number of 900 to 1100, an ash content of 10 to 12% by weight, as compared to 7 to 10% for Example 1, an abrasion number of 80, as compared to 60 to 70 for Example 1, and an apparent density of 0.48 to 0.50 gram/cc as compared to 0.45 to 0.48 for Example 1.

Thus, the resulting granules were hard, very adsorptive, and except for ash content, were comparable to other grades of granular activated carbon preferred for use in waste water treatment and other applications. It is to be noted once again that an acceptable product can be made from sub-bituminous coal without a carbonaceous binder and without charring, and that mixing with a small amount of concentrated acid significantly increases yield and adsorption, as compared to Example 1. As for using $H_2SO_4$ or $H_3PO_4$ as the acid, $H_3PO_4$ is clearly more effective in producing a granular activated carbon product with higher yield (30 to 35% for $H_3PO_4$ versus 25 to 30% for $H_2SO_4$).

EXAMPLE 4

MIXING OF HCL AND SUB-BITUMINOUS COAL GRANULES IN MAKING GRANULAR ACTIVATED CARBON

The same procedure was followed as for Example 3, except that concentrated HCL of 95% by weight concentration was substituted for the concentrated $H_3PO_4$. The bulk density of the pellets was in the range of 1.1 to 1.2 grams/cc; the reformed granules had an apparent density of 0.64 to 0.66 gram/cc, and the devolatilized granules had an apparent density of 0.62 to 0.64 gram/cc, and a yield of 50% by weight based on the dry coal.

The overall yield of granular activated carbon, based on the dry coal, was in the range of 25 to 30% by weight, versus 20 to 22% for Example 1 and 30 to 35% for Example 3. The granules had a surface area of 900 to 1050 m²/gram, versus 900 to 1000 for Example 1, an iodine number of 900 to 1100, an ash content of 9 to 12% by weight, versus 7 to 10% for Example 1, and abrasion number of 80, versus 70 for Example 1, and an apparent density of 0.48 to 0.50 gram/cc, versus 0.45 to 0.48 for Example 1.

Thus, the resulting granules were hard, very adsorptive, and except for ash content, were comparable to other grades of granular activated carbon preferred for use in waste water treatment and other applications, particularly in view of the increases in yield, hardness and density over Example 1, which are attributed to the treatment with acid in lieu of the charring step. As compared to Example 2 ($H_2SO_4$), the yield and properties were substantially the same. As compared to Example 3 ($H_3PO_4$), the yield was lower (25 to 30% for HC1 versus 30 to 35% for $H_3PO_4$), but the properties were substantially the same.

The next two Examples represent an endeavor to see what happens when bituminous coal is treated conentionally and then in accordance with the inventive process, first without concentrated acid mixing prior to the addition of pitch, (Example 5) and second with concentrated acid mixing (Example 6), without the addition of pitch.

EXAMPLE 5

USE OF BITUMINOUS COAL AND PITCH TO MAKE GRANULAR ACTIVATED CARBON

The starting material was a batch of eastern bituminous coal having the following analyses by weight:

| Proximate Analysis | | | Ultimate Analysis | | |
|---|---|---|---|---|---|
| | As Received | Dry | | As Received | Dry |
| % Moisture | 2.04 | — | % Moisture | 2.04 | — |
| % Ash | 1.20 | 1.26 | % Carbon | 82.30 | 84.00 |
| % Volatile Material | 33.10 | 33.80 | % H | 5.20 | 5.29 |
| % Fixed Carbon | 63.60 | 64.90 | % $N_2$ | 1.30 | 1.33 |
| BTU/lb | 14,571 | 14,874 | % Ash | 1.23 | 1.26 |

These analyses are, in general, typical of eastern bituminous coals. These coals also are highly coking and low in ash content. The dried coal was crushed to obtain 8 × 30 mesh granules, 900 grams batches of which were mixed with No. 125 coal tar pitch of the following characteristics:

| | |
|---|---|
| Softening Point | 129.2° C |
| Benzene Insolubles | 33.2% by weight |
| Quinoline Insolubles | 13.1% by weight |
| Coking Value (Conradson) | 61.1% by weight |
| Ash | 0.17% by weight | in the ratio of 90 grams of coal granules and 10 grams of pitch (10 parts per hundred by weight).

The mixture was milled into very fine powder so tht 65% of the powder passed through 325 mesh screen. The milled powder was compressed into pellets ½inch diameter and ½inch high using a pressure of 40,000 to 80,000 psi. The pellets had a bulk density of 1.18 grams/cc and were granulated to obtain 6 × 20 mesh granules having an apparent density of 0.65 gram/cc.

600 grams of the granules were loaded into a cylindrical furnace and were subjected to the charring process substantially as described in Example 1. However, in this case, the charring consisted of heating the granules from room temperature to 250° C at 100° C/hour and maintaining at temperature for 2 hours. An atmosphere of 0.5 standard cubic feet per hour at 1 atmosphere and room temperature (SCFH) of $N_2$ and 0.5 SCFH of air was fed into the furnace while the cylindrical container was rotating at 1 to 4 rpm.

In the course of experimentation it was found that heating rate, atmosphere (particularly the amount of oxygen present), temperature and time at temperature were critical variables that had an important influence on how the granules were suited for further processing in making hard granular activated carbon. For example, too small a time (less than ½hour) at temperature or too low a temperature (lower than 200° C), in general, led to difficulties in further processing of the granules. Thus, without proper charring, during the devolatilization step, the granules fused together and were unsuitable for proper activation and for obtaining the desired porperties of the granular activated carbon.

When properly charred, as descrived above, the yield of the granules was 69% by weight, based on the dry coal pitch mixture and they had an apparent density of 0.62 gram/cc.

The charred granules then were devolatilized and activated in the same manner as described in Example 1.

At the end of the process, hard granular activated carbon was obtained, with an overall yield of 34.0% by weight based on the dry coal pitch mixture. The granules had an apparent density of 0.50 gram/cc, an iodine number of 1080, a surface area of 1040, ash content of 2.2% by weight, and an abrasion number of 80.

Thus, the resulting granules were hard, very adsorptive, low in ash, and in all respects very much comparable to the grades of carbon preferred for use in waste water treatment and other applications. However, it is particularly noteworthy that hard granular activated carbon could not be made from this bituminous coal without subjecting the granules to the charring step described above, prior to devolatilization and activation. During the course of experimentation, granules were devolatilized without the charring step and a fused mass (instead of granules) unsuitable for activation was obtained, thus indicating the necessity and importance of the charring step.

EXAMPLE 6

MIXING OF $H_3PO_4$ AND BITUMINOUS COAL WIHOUT PITCH TO MAKE GRANULAR ACTIVATED CARBON

The same procedure, as set forth in Example 5 was followed through the initial granulating step. At this point, 900 grams of the dry coal granules were mixed with about 5% by weight of 75% by weight concentrated $H_3PO_4$, in the ratio of 95 grams of coal and 5 grams of acid. The mixture was milled into 65% by weight −325 mesh powder, and was pressure into pellets of ½ inch diameter and ½ inch high using a pressure of 40,000 to 80,000 psi. The bulk density of the pellets was in the range of 1.1 to 1.2 grams/cc, and they were regranulated to obtain 6 × 20 mesh granules having an apparent density at this state of 0.64 gram/cc.

The reformed granules were loaded into a cylindrical furnace and were subjected to the charring step described in Example 5, producing a 65% by weight yield and an apparent density of 0.62 gram/cc. In the course of experimentation, it was learned that, even for acid mixed bituminous coal under the conditions employed, the charring step was necessary as a pre-treating step, in order to obtain proper granular activated carbon. A batch of such acid treated bituminous coal was devolatilized without the charring step, whereupon a fused mass of coke was obtained, which was unsuitable for further processing into granular activated carbon. This was very much unlike the experience with acid mixed sub-bituminous coal, wherein the charring step could be omitted without adverse consequences, and was both an unexpected and unique result.

The charred granules then were devolatalized and activated in the manner described in Example 1. At the end of the activation step, hard granular activated carbon was obtained, with an overall yield of 33% by weight based on the dry coal. The granules had an apparent density of 0.48 gram/cc, a surface area of 1000 m²/gram, an iodine number of 1050, an ash content of 7% by weight, and an abrasion number of 70 to 80.

Thus, the granules were hard, very adsorptive, low in ash and in all respects very must comparable to the grades of carbon preferred for use in waste water treatment and other applications. At the same time, it is particularly noteworthy that hard granular activated carbon could not be made from this bituminous coal without subjecting thr granules to the charring step described above, even though the coal had been acid mixed. In this regard, the result, is very much unlike that for sub-bituminous coal, wherein acid mixing enables one to eliminate the charring step, while still producing an acceptable product.

Another important and notable feature was that the acid mixing of bituminous coal with concentrated $H_3PO_4$ did not appear to significantly alter and yield (from 34 to 33%). In contrast, this result was very much unlike that for the sub-bituminous coal of Example 3 wherein concentrated $H_3PO_4$ acid mixing of the coal led to substantially improved yield from the 20 to 22% for Example 1 to the 30 to 35% of Example 5, which closely approximates the 34 to 33% yields of these last two Examples. These two results were indeed unique and unexpected in dealing with sub-bituminous coal.

The next Example represents an attempt to apply the concentrated acid mixing technique of the invention to lignite which ranks lower than sub-bituminous coal.

EXAMPLE 7

Mixing of $H_3PO_4$ and Lignite Coal Without Pitch In Making Granular Activated Carbon The starting material in this Example was a batch of lignite coal having the following analyses by weight:

| Proximate Analysis | | | Ultimate Analysis | | |
| --- | --- | --- | --- | --- | --- |
| | As Received | Dry | | As Received | Dry |
| % Moisture | 30.30 | — | % Moisture | 30.30 | — |
| % Ash | 9.92 | 14.23 | % Carbon | 41.50 | 59.5 |
| % Volatile Material | 50.00 | 71.71 | % H | 3.15 | 4.5 |
| % Fixed Carbon | 9.80 | 14.05 | % $N_2$ | 3.50 | 5.0 |
| | | | % S | 0.73 | 1.4 |
| | | | % Ash | 9.92 | 14.23 |

These analyses are, in general, typical of lignite coals, and these coals, in general, have a high ash content compared to other coals. The as received coal was dried partially to a moisture content of about 15% by weight and then crushed to 8 × 30 mesh granules, which were mixed in the ratio of 95 grams of granules to 5 grams of concentrated $H_3PO_4$ (75% by weight concentration). This mixture was thoroughly milled such that more than 65% of the powder material passed through 325 mesh screen, preferably 75 to 85% −325 mesh. The powder was pressed into cylindrical pellets of ½ inch diameter and ½ inch high, using a pressure of 40,000 to 80,000 psi, the apparent density of the pellets being in the range of 1.1 to 1.2 grams/cc. The pellets were granulated to obtain 6 × 20 mesh granules having an apparent density of 0.58 to 0.62 gram/cc. The granules were devolatilized and activated as described in Examples 2 to 4.

The resulting granules had very low apparent density, of 0.25 to 0.30 gram/cc, a surface area of 1000, an iodine number of 1050, and an ash content of 16% by weight. The granules showed no cohesion and very very low abrasion. Repeated experiments to optimize the properties, while showing some improvement, did not produce the preferred required density of 0.48 gram/cc or higher, and abrasion number of 70 or higher. Thus, an acceptable granular activated carbon which is hard and suitable for a variety of applications in liquid phase, such as waste water treatment, could not be produced under the aforementioned conditions from lignite coal.

Thus, it is patently obvious from this end and the foregoing Examples that:

A. Mixing a bituminous coal with concentrated acid did not materially affect the processability of the coal into hard granular carbon or the present yield of the said carbon from coal, and the concentrated acid mixing step did not eliminate the necessity of a charring step.

B. Mixing a lignite coal with concentrated acid did not result in an acceptable granular activated carbon where the carbon from lignite was too light and too soft.

C. In contrast, it clearly has been demonstrated in the preferred inventive embodiments that hard granular carbons suitable for waste water and other applications can be produced from sub-bituminous coal, provided the said coal is subjected to appropriate mixing treatment with concentrated acid (because very hard granular activated carbon can not be produced from the untreated sub-bituminous coal), and that such treatment does result in an unexpected and hence an inventive result of high precent yield of granular activated carbon from sub-bituminous coal, where the yield is fairly comparable to that from bituminous coal, particularly comparing Example 3 with Examples 4 and 5.

D. Another indeed unexpected result of the appropriate mixing treatment of sub-bituminous coal with concentrated acid is that the charring step found necessary for treated and untreated bituminous coal and for untreated sub-bituminous coal can be eliminated in making hard, dense, adsorptive granular activated carbon from so treated sub-bituminous coal.

The next Example is similar to Example 3, but emphasizes the importance of controlling the moisture content of the coal and/or the granules formed therefrom, and/or the treated granules and/or the powder formed from the treated granules.

EXAMPLE 8

Mixing of $H_3PO_4$ and Sub-bituminous Coal Without Pitch in Making Granular Activated Carbon: Importance of Controlling Moisture Content Since the moisture content (including acid) of the powder formed from the treated granules is used as a temporary binder in forming the pellets, the following experiments were conducted as variations in the procedure of Example 3, in order to help define the operative and preferred ranges of the moisture content of the coal and powder.

A batch of the Wyoming sub-bituminous coal of Example 1 was dried thoroughly, then crushed and screened to obtain 8/30 mesh granules which were mixed with 75% by weight concentrated $H_3PO_4$ in the ratio of 95 grams of coal and 5 grams of acid. The mixture was milled to obtain very fine powder such that more than 65% by weight, preferably 75 to 85%, passed through a 325 mesh screen. Then the powder was pressed into pellets, as in Example 3. However, in this instance, when the coal was dried thoroughly prior to processing [the moisture content, including acid, of the treated granules being under 10% by weight, i.e., about 6% (actually 5.95) or 7% (actually 6.90)], the powder could not be compacted into pellets suitable for the desired further processing. The pellets readily disintegrated into powder, even when care was used in regranulating, and the few granules obtained had little cohesion and could not be processed further.

Another batch of the said Wyoming sub-bituminous coal of Example 1 was crushed and screened to obtain 8 × 30 mesh granules, and sufficient water was added such that the moisture content was in the range of 30 to 35% by weight. To this was added the 75% by weight concentrated $H_3PO_4$ in the ratio of 95 grams of coal and 5 grams of acid. The mixture was milled into powder and pelletized, as in Example 3, to produce pellets having an apparent density of 1.2 grams/cc. However, on regranulation to obtain 6/20 mesh granules, the pellets disintegrated into powder with few granules. Even those granules obtained had little cohesion and could not be processed further.

Thus, it has been demonstrated from this and the foregoing inventive Examples that the moisture content, if any, by weight, of the coal should be not more than about 30%, preferably not less than about 5%, and most preferably about 10 to about 25%. Inasmuch as the powder from the treated granules could not be processed successfully below or above the moisture levels of about 10 and about 30% by weight (including acid content), these are the operative limits of such powder, with more than about 10% but not less then about 30% by weight, say about 15 to about 25% by weight, being the preferred limits. These moisture content limits, of course, take into account the operative limits of the concentrated acid, namely not less than about 1 and not more than about 10% by weight, preferably about 5%, at a concentration of at least about 50% by weight, preferably at least about 75% by weight.

The most preferred procedure for controlling moisture content is to start with a coal having a moisture content, by weight, within the desired range, namely not more than about 30%, preferably not less than about 5%, and most preferably about 10 to about 25%, such as the 17% content of the as received Wyoming sub-bituminous coal used herein. However, if the coal is too wet or too dry, then its moisture content can be controlled by drying or wetting respectively, as shown at the upper right of the drawing.

Continuing with the most preferred procedure, the amount, by weight, of concentrated acid added, within the aforesaid operative limits of not less than about 1 nor more than about 10%, and preferably about 5%, should be such as to control the granular moisture (including acid) content, by weight, within the aforesaid operative limits of not less than about 10 nor more than about 30%, preferably about 15 to about 25%, such as the about 21% content obtained when about 5% acid is added to such 17% moisture Wyoming sub-bituminous coal used herein. Of course, the moisture content of the powder will be the same or substantially the same as that of the granules when following such most preferred procedure, which eliminates any wetting or drying steps, as well as facilitating material handling while optimizing acid mixing treatment.

However, if desired, the moisture content can be controlled in the same manner as for the coal, following granulating and before acid treatment, as shown at the upper left of the drawing. However, for ease of granulating in the first instance, so controlling the moisture content of the coal is preferred, because this minimizes dusting when the coal is too dry and gumming when the coal is too wet.

Alternatively, the moisture (including acid) content of the granules, following acid treatment and prior to powderizing, can be controlled by appropriate wetting or drying to an amount within the aforesaid limits, as shown at the right of the drawing. While such moisture control at this stage of the process is not preferred, it is feasible where the moisture content is too low for proper pelletizing, because it does minimize dusting during powderizing albeit dusting is a problem during initial granulating. Where the moisture content is too high, the acid tends to become more diluted during mixing, requiring more acid for proper mixing treatment than where the moisture content is normal, gumming does become a problem during initial granulating, and material handling is more difficult.

As a further alternative, the moisture content (including acid) of the powder can be controlled just prior to pelletizing, as shown at the left of the drawing. While such moisture control at this stage of the process also is not preferred, it is feasible where the moisture content is too low for proper pelletizing, albeit dusting is a problem during initial granulating and powderizing. Where the moisture content is too high, control at this stage has the same disadvantages as moisture control between acid mixing and powderizing, with the additional problem of gumming during powderizing.

Nevertheless, this invention does contemplate moisture control at any one or more of the aforesaid stages, in order that the moisture (including acid) content of the powder be within at least the aforesaid operative limits, by weight, of not less than about 10 nor more than about 30%, preferably about 15 to about 25%, for proper pelletizing and further processing.

The next Example is similar to Example 3, but emphasizes the importance of fineness of grind in powderizing the treated granules before pelletizing.

EXAMPLE 9

Fineness Of Powder In Mixing $H_3PO_4$ And Sub-bituminous Coal Without Pitch in Making Granular Activated Carbon The same procedure, as set forth in Example 3, was followed through the acid treatment step. Then the mixture was divided into 2 equal parts.

The first part was milled to a fine powder which was about 60 to about 65% by weight −325 mesh. The powder was compacted into pellets of approximately ½ inch high and ½ inch diameter under a pressue of 40,000 to 80,000 psi, and the apparent density of the pellets was in the range of 1.1 to 1.2 gram/cc. The pellets were granulated to 6 by 20 mesh and the density of the granules were 0.64 to 0.66 gram/cc. The granules were devolatilized as in Example 3 and the density of granules was 0.57 to 0.59 gram/cc. These granules were activated as described in earlier Example 3, and these activated granules had a density of 0.44 to 0.47 gram/cc, an iodine number of 1000 to 1100, a surface area of 900 to 1050 m$^2$/gram, an ash content of 10 to 12% by weight, and an abrasion number of 55 to 65. Thus, these granules are considerably softer and hence are not too suitable for use in waste water applications, because of possible excessive loss of material in use and regeneration when the granules are not very hard.

The second part was milled to a very fine powder such that it had a particle size of 75 to 85% by weight −325 mesh. The powder was compacted, as above, to a pellet density of 1.1 to 1.2 gram/cc; the pellets were granulated and had a density of 0.65 to 0.68 gram/cc. The granules were activated, as above, and the apparent density of the activated granules was 0.48 to 0.50 gram/cc. The granules had an iodine number of 1000 to 1100, surface area of 900 to 1050 m$^2$/gram, ash content of 10 to 12%, by weight and an abrasion number of 80.

Since the granules were subjected otherwise to identical processing conditions in part 1 and part 2, it is believed that the finer grinding of the treated sub-bituminous coal granules (75 to 85% −325 mesh) resulted in compact granules and hence a hard granular product. In contrast, as described in Example 5 to 6, grinding the bituminous coal to 65% −325 mesh resulted in a hard granular product.

Thus, the fineness of the grind prior to compaction, required for sub-bituminous coal, as compared to bituminous coal, is an unexpected requirement which could not have been deduced from prior art, and hence forms a preferred embodiment of the present invention.

It now is seen how the invention accomplishes its various objectives. Likewise, it is to be understood that while the invention has been described and illustrated herein by reference to certain preferred embodiments, the same are to be considered as illustrative, rather than as limiting.

I claim:

1. A process for making granular activated carbon comprising: forming granules from sub-bituminous coal; treating the granules by mixing with not less than about 1 and not more than about 10% by weight of concentrated inorganic acid selected from the group consisting of $H_2SO_4$, $H_3PO_4$, HCl and mixtures thereof at a concentration of at least about 50% by weight without the addition of a carbonaceous binder; reducing the treated granules to form powder of more than about 65% by weight −325 mesh and having a moisture, including acid, content of not less than about 10 and not more than about 30% by weight; compressing the powder to form pellets; reducing the pellets to reform granules; devolatilizing the reformed granules, without charring, by heating directly to and at a temperature higher than the charring temperature in an oxygen-free atmosphere; and activating the devolatilized granules by heating to and at a temperature higher than the devolatilizing temperature in an atomsphere containing a gaseous activating agent in order to produce a overall yield of granular activated carbon of about 25 to about 35% by weight, dry coal.

2. Granular activated carbon made by the process of claim 1.

3. The process of claim 1 wherein the coal has a moisture content of not more than about 30% by weight.

4. Th process of claim 1 wherein the acid is $H_3PO_4$.

5. The process of claim 1 wherein the coal has a moisture content of not less than about 5 and not more than about 30% by weight.

6. The process of claim 5 wherein the moisture content of the coal is about 10 to about 25% by weight.

7. The process of claim 6 wherein granules of about 8/30 mesh are formed from sub-bituminous coal having, in the as received condition, by weight, a proximate analysis of about 17% moisture, about 44% volatile material, about 2.05% ash, and about 35% fixed carbon, and an ultimate analysis of about 69.8% carbon, about 5.4% hydrogen, about 0.9% nitrogen, and about 0.55% sulfur.

8. The process of claim 1 wherein the granules are mixed with about 5% by weight of acid, at a concentration of at least about 75% by weight.

9. The process of claim 8 wherein the acid is $H_3PO_4$.

10. The process of claim 1 wherein the treated granules have a moisture, including acid, content of not less than about 10 and not more than about 30% by weight.

11. The process of claim 10 wherein the moisture content of the treated granules is more than about 10% by weight.

12. The process of claim 11 wherein the moisture content of the treated granules is about 15 to about 25% by weight.

13. The process of claim 1 wherein the powder is about 75 to about 85% by weight −325 mesh.

14. The process of claim 1 wherein the powder has a moisture, including acid, content of more than about 10% by weight.

15. The process of claim 14 wherein the moisture content of the powder is about 15 to about 25% by weight.

16. The process of claim 1 wherein the powder is compressed to form pellets of about 0.5 inch diameter and about 0.5 inch under a pressure of about 40,000 to about 80,000 psi.

17. The process of claim 1 wherein the pellets are reduced to reform granules of about 6/20 mesh.

18. The process of claim 1 wherein the reformed granules are devolatilized by heating to a temperature of about 450° C at a rate of about 300° C/hour in an atmosphere of $N_2$ and the volatiles and by maintaining the devolatilizing temperature for a time of about 1 hour.

19. The process of claim 1 wherein the devolatilized granules are activated by heating to a temperature of about 800° to about 900° C in an atmosphere of $N_2$ and steam and by maintaining the activating temperature for a time of about 4 to about 5 hours.

20. A process for making granular activated carbon and comprising: forming granules from sub-bituminous coal; treating the granules by mixing with about 5% by weight of concentrated inorganic acid selected from the group consisting of $H_2SO_4$, $H_3PO_4$, HCl and mixtures thereof at a concentration of at least about 75% by weight, without the addition of a carbonaceous binder; reducing the treated granules to form powder of more than about 65% by weight −325 mesh and having a moisture, including acid, content of about 15 to about 25% by weight; compressing the powder to form pellets; reducing the pellets to reform granules; devolatilizing the reformed granules, without charring, by heating directly to a temperature of about 450° C at a rate of about 300° C/hour in an oxygen-free atmosphere of $N_2$ and the volatiles and by maintaining the devolatilizing temperature for a time of about 1 hour; and activating the devolatilized granules by heating to a temperature of about 800 to about 900° C in an atmosphere of $N_2$ and steam and by maintaining the activating temperature for a time of about 4 to about 5 hours; in order to produce an overall yield of granular activated carbon of about 25 to about 35% by weight, dry coal.

21. Granular activated carbon made by the process of claim 20 and having a surface area of about 900 to about 1050 m²/gram, an iodine number of about 900 to about 1100, an ash content of about 9 to about 12% by weight, an abrasion number of about 80, and an apparent density of about 0.48 to about 0.50 gram/cc.

22. The process of claim 20 wherein the acid is $H_3PO_4$, in order to produce an overall yield of granular activated carbon of about 30 to about 35% by weight, dry coal.

23. Granular activated carbon made by the process of claim 22 and having a surface area of about 900 to about 1050 m²/gram, an iodine number of about 900 to about 1100, an ash content of about 10 to about 12% by weight, an abrasion number of about 80, and an apparent density of about 0.48 to about 0.50 gram/cc.

* * * * *